United States Patent
Dobashi

(10) Patent No.: US 11,386,500 B2
(45) Date of Patent: Jul. 12, 2022

(54) INSURANCE PREMIUM SETTING SYSTEM

(71) Applicant: HONDA MOTOR CO., LTD., Tokyo (JP)

(72) Inventor: Manabu Dobashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/770,967

(22) PCT Filed: Dec. 12, 2017

(86) PCT No.: PCT/JP2017/044601
§ 371 (c)(1),
(2) Date: Jun. 9, 2020

(87) PCT Pub. No.: WO2019/116450
PCT Pub. Date: Jun. 20, 2019

(65) Prior Publication Data
US 2021/0166324 A1    Jun. 3, 2021

(51) Int. Cl.
*G06Q 40/08* (2012.01)
*G06Q 30/02* (2012.01)
(Continued)

(52) U.S. Cl.
CPC ......... *G06Q 40/08* (2013.01); *G06Q 30/0284* (2013.01); *G06Q 30/0645* (2013.01); *G07C 3/02* (2013.01)

(58) Field of Classification Search
CPC ............... G06Q 40/08; G06Q 30/0284; G06Q 30/0645; G07C 3/02
(Continued)

(56) References Cited

U.S. PATENT DOCUMENTS 8,428,971 B2 * 4/2013 Peterie .................. G06Q 40/08
705/4
8,595,034 B2 * 11/2013 Bauer .................... G06Q 40/02
705/4
(Continued)

FOREIGN PATENT DOCUMENTS

JP    2004-224265    8/2004
JP    2004-295421    10/2004
(Continued)

OTHER PUBLICATIONS

Reich-Hale, "State Farm spurs auto policy questions", National Underwriter, Property & Casualty/risk & benefits management ed. 104.2:2, 18. ALM Media Properties, LLC, Jan. 10, (Year: 2000).*
(Continued)

*Primary Examiner* — Frantzy Poinvil
(74) *Attorney, Agent, or Firm* — Amin, Turocy & Watson, LLP

(57) ABSTRACT

This insurance premium setting system sets an insurance premium for obtaining compensation for the breakdown of a working machine, when the working machine is rented out. The insurance premium setting system is provided with an insurance premium setting unit which sets the insurance premium on the basis of breakdown-related information which is related to the possibility of breakdown of the working machine, when a user uses the working machine. The breakdown-related information is working information on the working machine, and the insurance premium setting unit sets the insurance premium on the basis of the working information. The working information includes a working load of the working machine, and the insurance premium setting unit sets the insurance premium more expensively, as the working load becomes larger.

8 Claims, 4 Drawing Sheets

(51) Int. Cl.
*G06Q 30/06* (2012.01)
*G07C 3/02* (2006.01)

(58) Field of Classification Search
USPC .................................................. 705/3–44
See application file for complete search history.

(56) References Cited

U.S. PATENT DOCUMENTS

| | | | | |
|---|---|---|---|---|
| 8,719,134 B1* | 5/2014 | Huls | ................ | G06Q 30/0283 |
| | | | | 705/35 |
| 8,930,228 B1* | 1/2015 | Ball | ................ | G06Q 40/06 |
| | | | | 705/4 |
| 9,721,400 B1* | 8/2017 | Oakes, III | ............ | G07C 5/0808 |
| 10,713,726 B1* | 7/2020 | Allen | ................ | G06Q 40/08 |
| 2002/0016655 A1* | 2/2002 | Joao | ................ | G07C 5/085 |
| | | | | 701/33.4 |
| 2004/0153362 A1* | 8/2004 | Bauer | ................ | G06Q 40/08 |
| | | | | 705/4 |
| 2008/0065427 A1* | 3/2008 | Helitzer | ................ | G06F 19/00 |
| | | | | 705/4 |
| 2012/0239581 A1* | 9/2012 | Mosher | ................ | G06Q 50/163 |
| | | | | 705/302 |
| 2013/0013344 A1* | 1/2013 | Ernstberger | ........... | G06Q 40/08 |
| | | | | 705/4 |
| 2015/0081359 A1 | 3/2015 | Mejegard et al. | | |
| 2015/0204758 A1 | 7/2015 | Schnell et al. | | |
| 2016/0005130 A1* | 1/2016 | Devereaux | ........... | G06V 20/176 |
| | | | | 705/4 |
| 2016/0048924 A1* | 2/2016 | Arnatt | ................ | G06Q 40/08 |
| | | | | 705/4 |
| 2017/0124658 A1* | 5/2017 | Gordon | ................ | G06Q 40/08 |
| 2017/0221151 A1* | 8/2017 | Forkuo | ................ | H04N 7/185 |

FOREIGN PATENT DOCUMENTS

| | | |
|---|---|---|
| JP | 2006-113847 | 4/2006 |
| JP | 2006-155008 | 6/2006 |
| JP | 2008-168790 | 7/2008 |

OTHER PUBLICATIONS

International Search Report and Written Opinion for International Application No. PCT/JP2017/044601 dated Mar. 13, 2018, 8 pages.
Extended European Search Report for European Patent Application No. 17935036.8 dated Jul. 24, 2020.

* cited by examiner

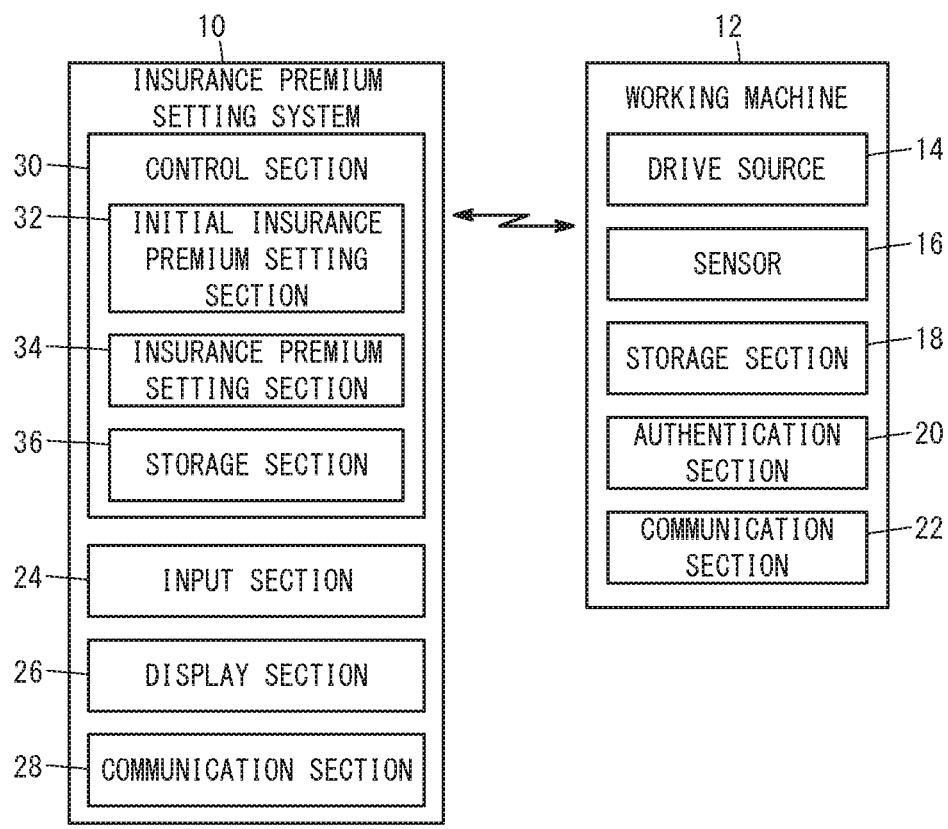

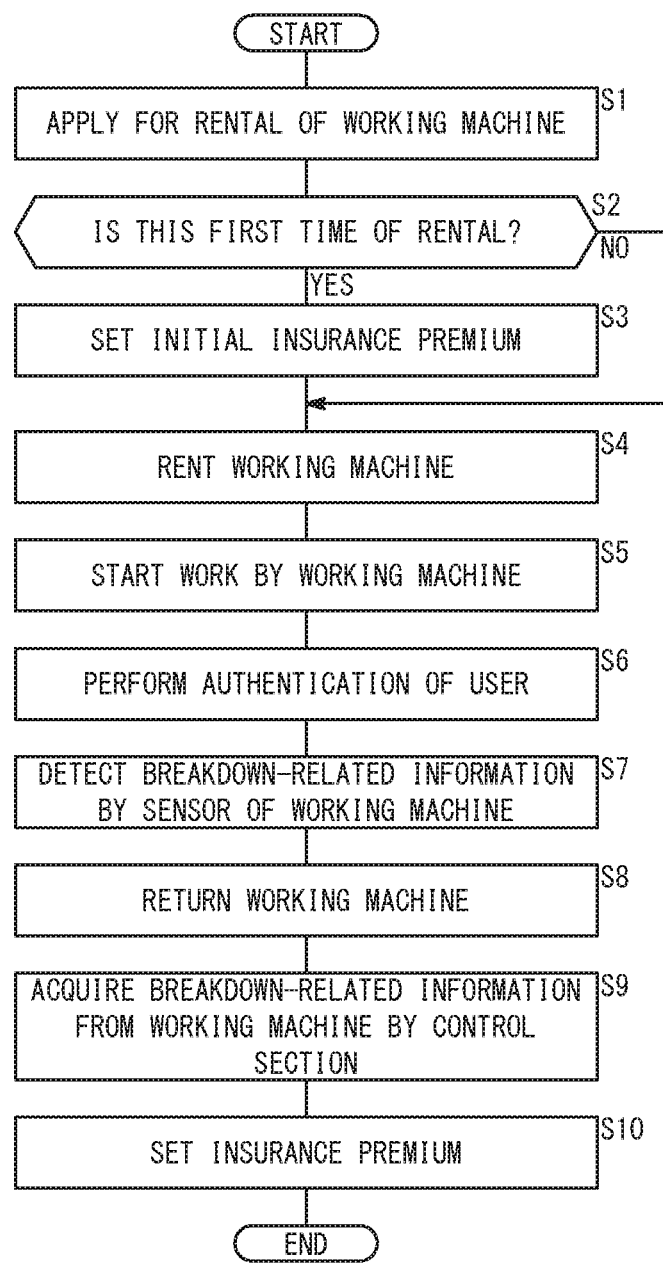

INSURANCE PREMIUM SETTING SYSTEM

TECHNICAL FIELD

The present invention relates to an insurance premium setting system that sets an insurance premium for obtaining compensation for breakdown of a working machine, when the working machine is rented.

BACKGROUND ART

In recent years, a rental system of a working machine such as a lawnmower or a cultivator, for example, has been utilized. In this kind of rental system, an insurance premium of fixed amount per day is set as an insurance premium for obtaining compensation for breakdown of the rented working machine. Note that in the field of vehicles, there has been proposed a system that sets the insurance premium based on driving skill, driving experience or the like of a driver (refer to Japanese Laid-Open Patent Publication No. 2004-295421).

SUMMARY OF INVENTION

In the case of the insurance premium being of fixed amount as in a conventional rental system of a working machine, sometimes, the insurance premium ends up being felt to be expensive for a user whose probability of causing the working machine to breakdown is low (such as a user with a wealth of working experience or a user who uses the working machine carefully) or a user who only uses the working machine for a short time (for example, one hour). Note that above-mentioned Japanese Laid-Open Patent Publication No. 2004-295421, which relates to an insurance premium of a vehicle, belongs to a different field from that for working machines.

The present invention has been made in view of such a problem, and has an object of providing an insurance premium setting system that can set an insurance premium appropriate to a use mode of a user.

In order to achieve the above-described object, an insurance premium setting system according to the present invention is an insurance premium setting system that sets an insurance premium for obtaining compensation for breakdown of a working machine, when the working machine is rented, the insurance premium setting system comprising an insurance premium setting section configured to set the insurance premium based on breakdown-related information related to possibility of breakdown of the working machine when a user uses the working machine.

According to such a configuration, a user for whom possibility of breakdown of the working machine is low can have his/her insurance premium set to a lower amount than a user for whom possibility of breakdown of the working machine is high. As a result, an insurance premium appropriate to the use mode of the user can be set. Moreover, since it is possible for the user to be made aware of the kind of use by which the working machine is less likely to break down, a reduction in breakdown rate of the working machine can be achieved.

In the above-described insurance premium setting system, the breakdown-related information may be working information of the working machine, and the insurance premium setting section may set the insurance premium based on the working information.

According to such a configuration, an appropriate insurance premium can be specified based on the working information.

In the above-described insurance premium setting system, the working information may include a working load of the working machine, and the insurance premium setting section may set the insurance premium to a higher amount as the working load increases.

According to such a configuration, the insurance premium can be set to a higher amount as the working load increases and a possibility of breakdown becomes higher.

In the above-described insurance premium setting system, the working information may include a continuous working time of the working machine, and the insurance premium setting section may set the insurance premium to a higher amount as the continuous working time increases.

According to such a configuration, a user whose working time is a short time can rent the working machine at an insurance premium of low amount.

In the above-described insurance premium setting system, the working information may include a cumulative working time of the working machine from an initial rental time of the user, and the insurance premium setting section may set the insurance premium to a lower amount as the cumulative working time increases.

According to such a configuration, a user whose cumulative working time is long can rent the working machine at an insurance premium of low amount.

In the above-described insurance premium setting system, the insurance premium setting section may set the insurance premium based on a reference insurance premium and the breakdown-related information.

According to such a configuration, the insurance premium can be simply calculated.

The above-described insurance premium setting system may further comprise an initial insurance premium setting section configured to set an initial insurance premium based on user information, and the insurance premium setting section may employ, as the reference insurance premium, the initial insurance premium set by the initial insurance premium setting section.

According to such a configuration, the insurance premium can be set using the initial insurance premium.

In the above-described insurance premium setting system, the insurance premium setting section may employ, as the reference insurance premium, the insurance premium that is set last time.

According to such a configuration, the insurance premium set last time can be reflected in the insurance premium to be set this time.

In the above-described insurance premium setting system, the working machine may be configured to detect the breakdown-related information and transmit the breakdown-related information to the insurance premium setting system, the insurance premium setting system may further comprise a storage section configured to store the breakdown-related information transmitted from the working machine, and the insurance premium setting section may set the insurance premium based on the breakdown-related information stored in the storage section.

According to such a configuration, the insurance premium can be simply set referring to the breakdown-related information stored in the storage section.

In the above-described insurance premium setting system, the working machine may comprise an authentication section configured to identify the user operating the working machine, and the storage section may store information of the user identified by the authentication section, and the breakdown-related information, in association with each other.

According to such a configuration, the insurance premium can be set using the breakdown-related information of the user who has actually used the working machine.

In the above-described insurance premium setting system, the working load may be specified based on a temperature of a motor driver controlling a motor of the working machine, a voltage of the motor driver, a number of occurrences of motor lock that stops rotation of the motor, a temperature of an engine of the working machine, a voltage of a battery of the working machine, or a number of occurrences of operation interlock that stops drive of the engine.

According to such a configuration, the working load can be easily specified.

BRIEF DESCRIPTION OF DRAWINGS

FIG. 1 is a block diagram of an insurance premium setting system and a working machine according to an embodiment of the present invention;

FIG. 2 is a flowchart explaining a procedure of setting an insurance premium using the insurance premium setting system;

DESCRIPTION OF EMBODIMENTS

Figure 3A:
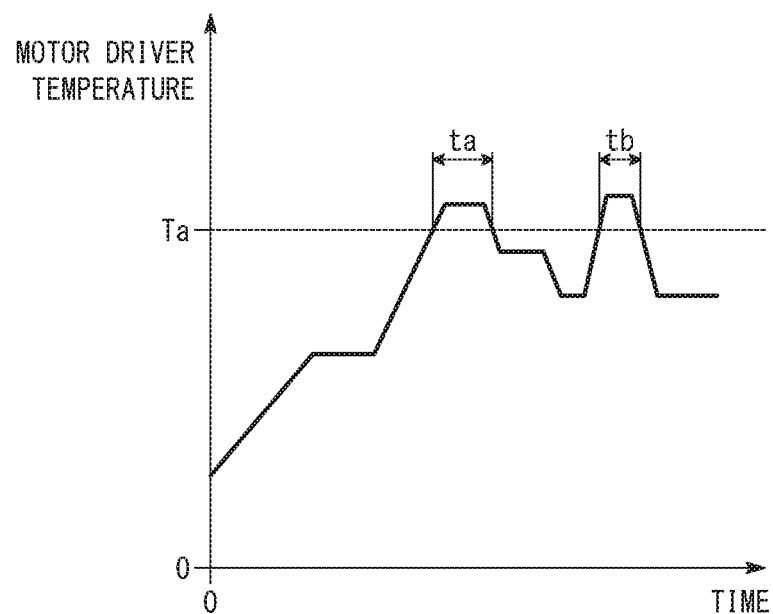
FIG. 3A is a graph showing a relationship of time and motor driver temperature.

A preferred embodiment of an insurance premium setting system according to the present invention will be presented and described below with reference to the accompanying drawings.

An insurance premium setting system 10 according to an embodiment of the present invention sets an insurance premium for obtaining compensation for breakdown of a working machine 12, when the working machine 12 is rented. A lawnmower, an automated lawnmower, a cultivator, and a snow removal machine, for example, are employed as the working machine 12.

As shown in FIG. 1, the working machine 12 comprises a drive source 14, a sensor 16, a storage section 18, an authentication section 20, and a communication section 22. As the drive source 14, which is for driving the working machine 12, a motor, for example, is employed. However, the drive source 14 may be an engine, or may be a hybrid of a motor and an engine. The sensor 16 detects breakdown-related information related to breakdown of the working machine 12. The breakdown-related information includes working information and environment information (working environment). The working information includes working load, continuous working time, cumulative working time, impact amount, and so on.

The working load, which is a load acting on the working machine 12, is specified based on a temperature of a motor driver. The continuous working time is a time that the working machine 12 is continuously driven. Note that the continuous working time may or may not include an idling time. The cumulative working time is a total working time from an initial rental time to the present time. The impact amount, which is an impact amount acting on the working machine 12, is detected by an accelerator sensor, for example. The working environment includes weather, air temperature, and so on, of a place where the working machine 12 is used at a time when the working machine 12 is used.

The authentication section 20 identifies the user actually operating the working machine 12, by biometric authentication. The storage section 18 stores the breakdown-related information detected by the sensor 16, and an operator identified by the authentication section 20 in association with each other. The communication section 22 transmits and receives information to and from the insurance premium setting system 10.

The insurance premium setting system 10 comprises an input section 24, a display section 26, a communication section 28, and a control section 30. The input section 24, which is for inputting information required in setting of the insurance premium, includes a keyboard and a mouse, for example. The display section 26 is configured by a liquid crystal display or an organic EL display, for example, and displays various kinds of information on a screen. Note that the input section 24 may be a touch panel provided in the display section 26.

The communication section 28 transmits and receives information to and from the communication section 22 of the working machine 12. Transmitting and receiving of information between the communication section 22 and the communication section 28 may be performed via the internet, or may be performed directly, unmediated by the internet.

The control section 30 is a computer including a microcomputer, includes a CPU (Central Processing Unit), a ROM and a RAM being memories, and so on, and functions as various function realizing sections (function realizing units) by the CPU reading and executing a program stored in the ROM. Note that the various function realizing sections can also be configured by a function realizing apparatus as hardware.

The control section 30 includes an initial insurance premium setting section 32, an insurance premium setting section 34, and a storage section 36. The initial insurance premium setting section 32 sets an initial insurance premium at the initial rental time, based on user information. The insurance premium setting section 34 sets the insurance premium for the next rental time, based on the breakdown-related information related to possibility of breakdown of the working machine 12 when the user uses the working machine 12.

Next, a procedure by which the insurance premium setting system 10 sets the insurance premium for the next time of rental of the working machine 12 when the working machine 12 is rented at a working machine rental company, will be described.

First, in step S1 of FIG. 2, an applicant (a user) makes an application for rental of the working machine 12 to the working machine rental company. Specifically, in the case of it being the first time of rental of the working machine 12, the applicant registers his/her user information in the insurance premium setting system 10. The user information includes, for example, name, sex, age, authentication information, number of years of experience using the working machine 12, and so on, of the applicant. The authentication information, which is information required for identity verification of the applicant, is, for example, fingerprint information, voiceprint information, retina information, iris information, portrait photo information, and so on.

In addition, the user (the applicant) inputs application information into the insurance premium setting system 10. The application information includes the number of times of rental up to now, the model of the working machine 12 to be rented, the number of days of renting, and so on. The application for rental may be made from the input section 24 of the insurance premium setting system 10, or may be made via the internet from a personal terminal (a mobile terminal, a tablet, a personal computer, or the like).

Next, in step S2, the control section 30 determines whether or not this is the first time of rental of the working machine 12, based on the application information. If it has been determined by the control section 30 that this is the first time of rental (step S2: YES), then in step S3, the initial insurance premium setting section 32 sets the initial insurance premium based on the user information.

Specifically, the initial insurance premium setting section 32 sets the initial insurance premium to a lower amount as the number of years of experience of using the working machine 12 increases, for example. In the case of this being the first time of rental, the initial insurance premium is the insurance premium this time. In the case of this not being the first time of rental (in the case of this being the second time of rental onwards), the insurance premium set on the last time of rental is the insurance premium this time. Note that if it has been determined by the control section 30 that this is not the first time of rental (step S2: NO), then processing proceeds to step S4, without processing of step S3 being performed.

Subsequently, in step S4, the user rents the working machine 12 from the working machine rental company. At this time, the user information (the authentication information, and so on) is transmitted to the communication section 22 of the working machine 12 from the communication section 28 of the insurance premium setting system 10 to be stored in the storage section 18 of the working machine 12.

Then, in step S5, the user starts work by the working machine 12. At this time, in step S6, the authentication section 20 of the working machine 12 authenticates (identifies) the user operating the working machine 12, by biometric authentication. Fingerprint authentication, voiceprint authentication, retina authentication, iris authentication, and face authentication, for example, may be cited as biometric authentication.

The working machine 12 is brought into a lock release state (a start-up capable state) when the user identified by the authentication section 20 matches the user information stored in the storage section 18, and into a lock state (a start-up incapable state) when the user identified by the authentication section 20 does not match the user information stored in the storage section 18. Note that in the case of a plurality of users (such as relatives of the applicant) are registered to one working machine 12, the lock release state (the start-up capable state) is attained when the user identified by the authentication section 20 matches any one of a plurality of user information items, and the lock state (the start-up incapable state) is attained when the user identified by the authentication section 20 does not match any of the plurality of user information items.

Next, in step S7, the sensor 16 of the working machine 12 detects the breakdown-related information of the working machine 12. Specifically, for example, the sensor 16 of the working machine 12 detects the temperature of the motor driver (refer to FIG. 3A). The breakdown-related information detected by the sensor 16 is stored in the storage section 18 of the working machine 12 in association with information of the user identified by the authentication section 20. As a result, breakdown-related information unique to each of the users is recorded.

Subsequently, in step S8, the user returns the working machine 12 to the rental company. Then, in step S9, the control section 30 acquires the breakdown-related information from the working machine 12. Specifically, the breakdown-related information stored in the working machine 12 is transmitted to the communication section 28 of the insurance premium setting system 10 from the communication section 22 of the working machine 12.

Next, in step S10, the insurance premium setting section 34 sets the insurance premium of the working machine 12 for the next rental time.

Specifically, the insurance premium setting section 34 calculates a correction value A based on a correction value calculation map and on the breakdown-related information related to breakdown of the working machine 12 (the working information). That is, in FIG. 3A, the insurance premium setting section 34 calculates an integrated value of time that the temperature of the motor driver is greater than or equal to an upper limit temperature (an overload time). In the example of FIG. 3A, the overload time is an integrated time of time to and time tb. The possibility of breakdown of the working machine 12 becomes higher as the overload time increases.

Figure 3B:
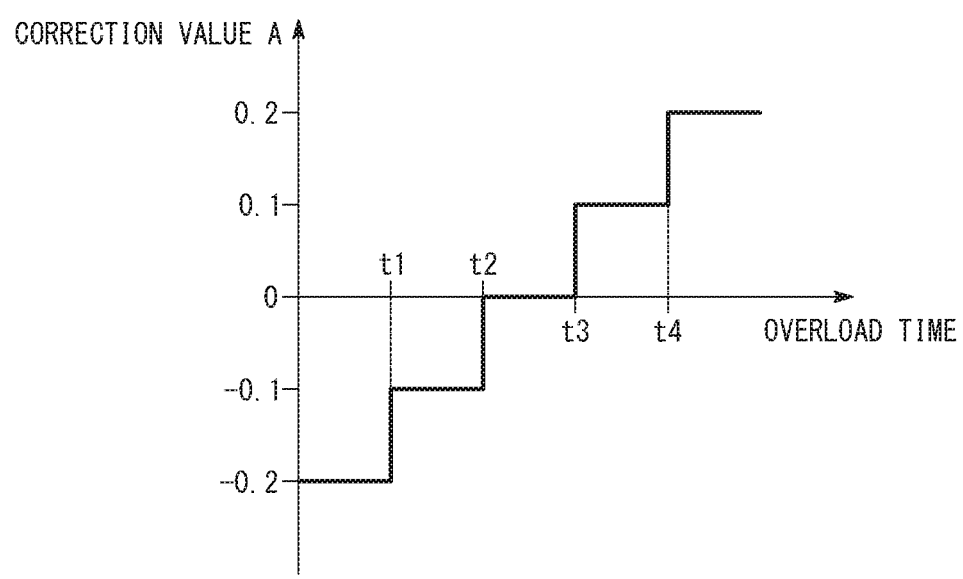
FIG. 3B is a graph showing a relationship of overload time and correction value.

Then, the insurance premium setting section 34 calculates the correction value A corresponding to the overload time by referring to the correction value calculation map shown in FIG. 3B, for example. In the example of FIG. 3B, the correction value A becomes −0.2 when the overload time is less than t1, becomes −0.1 when the overload time is greater than or equal to t1 but less than t2, becomes 0 when the overload time is greater than or equal to t2 but less than t3, becomes 0.1 when the overload time is greater than or equal to t3 but less than t4, and becomes 0.2 when the overload time is greater than or equal to t4.

In order to set an appropriate insurance premium, it is preferable for an upper limit value and a lower limit value to be set for the correction value A. In the example of FIG. 3B, the upper limit value is set to 0.2, and the lower limit value is set to −0.2. However, the upper limit value and the lower limit value are capable of being set arbitrarily.

Next, the insurance premium setting section 34 sets a performance coefficient $\alpha$ according to the following numerical formula (1).

$$\alpha = 1 + A \tag{1}$$

Then, the insurance premium setting section 34 sets the insurance premium for next time according to the following numerical formula (2).

$$Y = Ya \times \alpha \tag{2}$$

In numerical formula (2), Y is the insurance premium, and Ya is a reference insurance premium. The initial insurance premium is used as the reference insurance premium Ya during the first time of rental, and the insurance premium for this time (the insurance premium set during the last time of rental) is used as the reference insurance premium Ya during the second time of rental onwards. Thus, although in the present embodiment, a reference insurance premium Ya that differs each time is set every time rental is performed, the present invention is not limited to this, and it is possible too for a uniform fee to be used as the reference insurance premium Ya.

In the case of the correction value A being 0 (in the case of the performance coefficient $\alpha$ being 1), the insurance premium setting section 34 sets the reference insurance premium Ya as the insurance premium Y of the working machine 12 for the next rental time. In the case of the correction value A being less than 0 (in the case of the performance coefficient α being less than 1), the insurance premium setting section 34 sets the insurance premium Y of the working machine 12 for the next rental time to an amount which is lower than the reference insurance premium Ya. In the case of the correction value A being greater than 0 (in the case of the performance coefficient α being greater than 1), the insurance premium setting section 34 sets the insurance premium Y of the working machine 12 for the next rental time to an amount which is higher than the reference insurance premium Ya. After processing of step S10, the flowchart for this time ends.

Next, operational advantages of the insurance premium setting system 10 according to the present embodiment will be described below.

The insurance premium setting section 34 sets the insurance premium Y based on breakdown-related information related to possibility of breakdown of the working machine 12 when a user uses the working machine 12. Therefore, a user for whom possibility of breakdown of the working machine 12 is low can have his/her insurance premium Y set to a lower amount than a user for whom possibility of breakdown of the working machine 12 is high. As a result, an insurance premium Y appropriate to the use mode of the user can be set. Moreover, since it is possible for the user to be made aware of the kind of use by which the working machine 12 is less likely to break down, a reduction in breakdown rate of the working machine 12 can be achieved.

The insurance premium setting section 34 sets the insurance premium Y of the working machine 12 for the next rental time based on the working information of the working machine 12 being the breakdown-related information. Therefore, an appropriate insurance premium Y can be set based on the working information.

The working information includes the working load of the working machine 12, and the insurance premium setting section 34 sets the insurance premium Y to a higher amount as the working load increases. As a result, the insurance premium Y can be set to a higher amount as the working load of the working machine 12 increases and a possibility of breakdown of the working machine 12 becomes higher.

The insurance premium setting section 34 sets the insurance premium Y based on the reference insurance premium Ya and the breakdown-related information. As a result, the insurance premium Y can be simply set.

During the first time of rental, the initial insurance premium setting section 32 sets the initial insurance premium based on the user information (the number of years of experience using the working machine 12), and the insurance premium setting section 34 employs, as the reference insurance premium Ya, the initial insurance premium set by the initial insurance premium setting section 32. As a result, the insurance premium Y for the next rental time can be set using the initial insurance premium at the first time of rental.

During the second time of rental onwards, the insurance premium setting section 34 employs, as the reference insurance premium Ya, the insurance premium Y that is set last time (the insurance premium Y that is set during the last time of rental). As a result, the insurance premium set last time can be reflected in the insurance premium Y to be set this time.

The working machine 12 is configured to be capable of detecting the breakdown-related information and transmitting the breakdown-related information to the insurance premium setting system 10. The storage section 36 stores the breakdown-related information transmitted from the working machine 12, and the insurance premium setting section 34 sets the insurance premium Y based on the breakdown-related information stored in the storage section 36. As a result, the insurance premium Y can be simply set referring to the information stored in the storage section 18.

The working machine 12 comprises the authentication section 20 that identifies the user operating the working machine 12. The storage section 18 stores the information of the user identified by the authentication section 20 of the working machine 12, and the breakdown-related information, in association with each other. Therefore, the insurance premium Y can be set using the breakdown-related information of the user who has actually used the working machine 12.

The present invention is not limited to the above-mentioned configurations.

The working load of the working machine 12 may be specified based on a voltage of the motor driver. In this case, the insurance premium setting section 34 calculates an integrated value of time that the voltage of the motor driver is greater than or equal to an upper limit voltage (an overload time), and calculates the correction value A based on that overload time and a correction value calculation map.

The working load of the working machine 12 may be specified based on the number of occurrences of motor lock that stops rotation of the motor of the working machine 12. In this case, the insurance premium setting section 34 calculates the correction value A using a correction value calculation map indicating a relationship of the number of occurrences of motor lock and the correction value A. Note that the working machine 12 performs motor lock in the case where a detected speed is less than or equal to a certain stopping speed in a traveling state, and a duty ratio of a motor command is continuously greater than or equal to a motor lock determination duty ratio for a certain time.

The working load of the working machine 12 may be specified based on the number of times that a state of a stage prior to motor lock is established. In this case, the insurance premium setting section 34 calculates the correction value A using a correction value calculation map indicating a relationship of the number of times that a state of the stage prior to motor lock is established, and the correction value A. Note that the stage prior to motor lock refers to a state where a time that the duty ratio of the motor command is continuously greater than or equal to the motor lock determination duty ratio is shorter than a certain time (a time during which motor lock is judged).

The working load of the working machine 12 may be specified based on a voltage of a battery of the working machine 12. In this case, the insurance premium setting section 34 calculates an integrated value of time that the voltage of the battery is greater than or equal to an upper limit voltage (an overload time), and calculates the correction value A based on that overload time and a correction value calculation map.

In the case that the drive source 14 of the working machine 12 includes an engine, the working load of the working machine 12 may be specified based on a temperature of the engine. In this case, the insurance premium setting section 34 calculates an integrated value of time that the temperature of the engine is greater than or equal to an upper limit temperature (an overload time), and calculates the correction value A based on that overload time and a correction value calculation map.

In the case that the drive source 14 of the working machine 12 includes an engine, the working load of the working machine 12 may be specified based on the number of occurrences of operation interlock that stops the engine. In this case, the insurance premium setting section 34 calculates the correction value A using a correction value calculation map indicating a relationship of the number of occurrences of operation interlock and the correction value A.

The working load of the working machine 12 may be specified based on the number of times that a state of a stage prior to operation interlock of the engine is established. In this case, the insurance premium setting section 34 calculates the correction value A using a correction value calculation map indicating a relationship of the number of times that a state of the stage prior to operation interlock is established, and the correction value A.

Figure 4A:
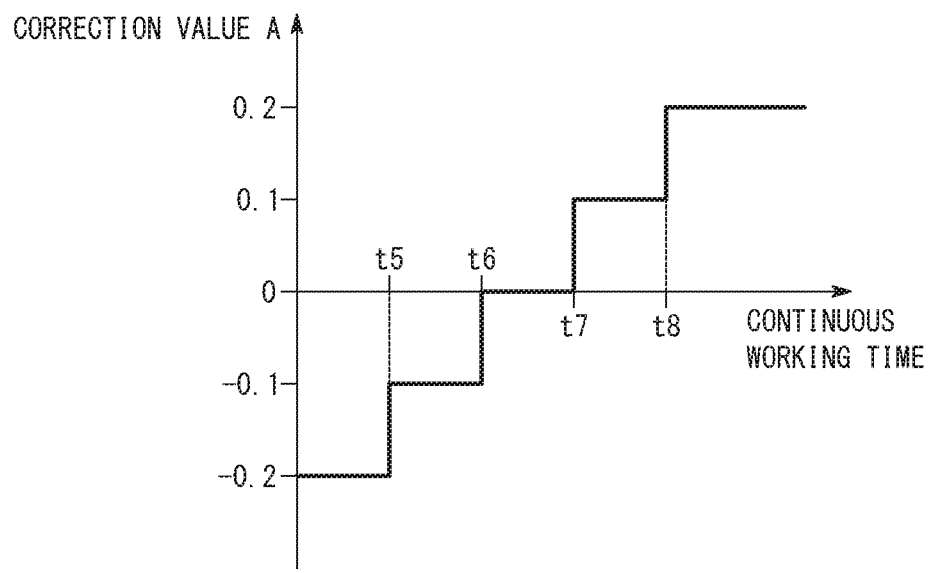
FIG. 4A is a graph showing a relationship of continuous working time and correction value.

The insurance premium setting section 34 may calculate the correction value A corresponding to continuous working time of the working machine 12 by referring to the correction value calculation map shown in FIG. 4A, for example. In the example of FIG. 4A, the correction value A becomes −0.2 when the continuous working time is less than t5, becomes −0.1 when the continuous working time is greater than or equal to t5 but less than t6, becomes 0 when the continuous working time is greater than or equal to t6 but less than t7, becomes 0.1 when the continuous working time is greater than or equal to t7 but less than t8, and becomes 0.2 when the continuous working time is greater than or equal to t8.

In other words, as the continuous working time increases, the correction value A becomes larger, hence the insurance premium setting section 34 sets the insurance premium Y to a higher amount. Note that, needless to say, the correction value calculation map for calculating the continuous working time is not limited to the example of FIG. 4A. As a result, a user whose working time is a short time can rent the working machine 12 at an insurance premium Y of low amount.

Figure 4B:
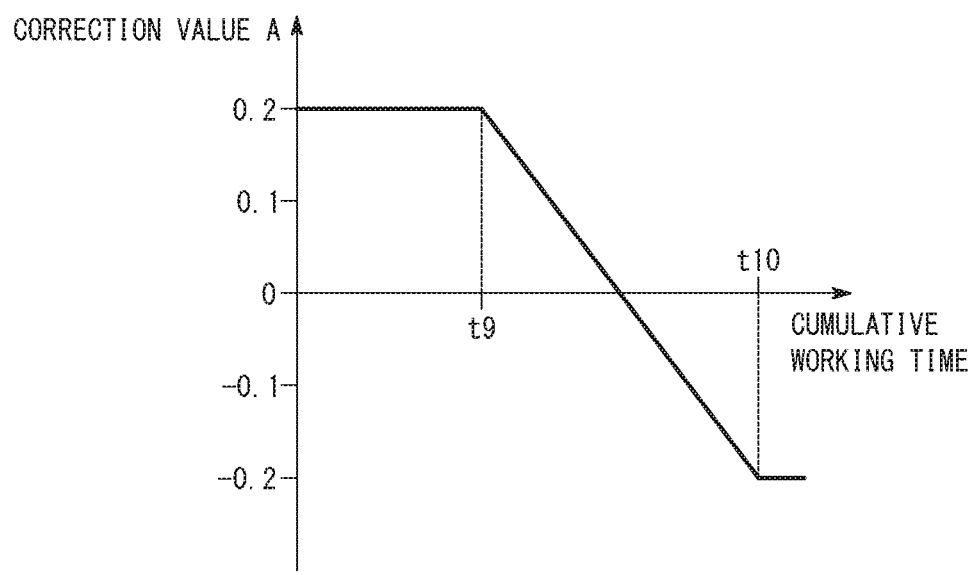
FIG. 4B is a graph showing a relationship of cumulative working time and correction value.

The insurance premium setting section 34 may calculate the correction value A corresponding to cumulative working time of the working machine 12 by referring to the correction value calculation map shown in FIG. 4B, for example. In the example of FIG. 4B, the correction value A becomes 0.2 when the cumulative working time is less than t9, becomes gradually lower as the cumulative working time increases from t9 to t10, and becomes −0.2 when the cumulative working time is greater than or equal to t10.

In other words, as the cumulative working time increases, the correction value A becomes smaller, hence the insurance premium setting section 34 sets the insurance premium Y to a lower amount. As a result, a user whose cumulative working time is long can rent the working machine 12 at an insurance premium Y of low amount.

The breakdown-related information detected by the sensor 16 of the working machine 12 may be transmitted to the insurance premium setting system 10 in real time via the internet. In this case, for example, the insurance premium setting section 34 may update the insurance premium Y of the working machine 12 a plurality of times (for example, every day) during rental. In other words, the insurance premium setting section 34 may set the insurance premium Y of the working machine 12 for the second day, based on the working information of the first day.

The sensor 16 of the working machine 12 may detect the working environment (air temperature, weather, and so on) in addition to the working information, and the insurance premium setting section 34 may set the insurance premium Y of the working machine 12 based on the working information and the working environment. Moreover, the insurance premium setting section 34 may set the insurance premium Y of the working machine 12 based solely on the working environment. The insurance premium setting section 34 may set the insurance premium Y based on information combining two or more of the working load, the continuous working time, the cumulative working time, and the impact amount.

The insurance premium setting section 34 may set the insurance premium Y for next time according to the following numerical formula (3).

$$Y = Ya + Z \qquad (3)$$

In numerical formula (3), Z is a performance adjustment fee. In this case, the insurance premium setting section 34 calculates the performance adjustment fee Z based on the breakdown-related information of the working machine 12. That is, the insurance premium setting section 34 directly calculates the performance adjustment fee Z, without calculating the above-mentioned correction value A and performance coefficient $\alpha$. In other words, the insurance premium setting section 34 calculates the performance adjustment fee Z corresponding to the working load by referring to a performance adjustment fee map indicating a relationship of the working load of the working machine 12 (the overload time, the number of occurrences of motor lock, the number of occurrences of operation interlock, and so on), and the performance adjustment fee Z.

The insurance premium setting system according to the present invention is not limited to the above-mentioned embodiment, and it goes without saying that a variety of configurations may be adopted without departing from the

What is claim is:

1. An insurance premium setting system that sets an insurance premium for obtaining compensation for breakdown of a working machine, when the working machine is rented, the insurance premium setting system comprising:
    an insurance premium setting section configured to set the insurance premium based on breakdown-related information related to possibility of breakdown of the working machine when a user uses the working machine, wherein the working machine is configured to detect the breakdown-related information and transmit the breakdown-related information to the insurance premium setting system,
    the insurance premium setting system further comprises an initial insurance premium setting section configured to set an initial insurance premium; and
    a storage section configured to store the breakdown-related information transmitted from the working machine,
    the insurance premium setting section sets the insurance premium according to a numerical formula: $Y = Ya \times \alpha$, where Y is the insurance premium, Ya is the reference insurance premium, and a is a performance coefficient,
    the initial insurance premium set by the initial insurance premium setting section is used as the reference insurance premium during a first time of rental, and the insurance premium set during a last time of rental is used as the reference insurance premium during a second time of rental onwards, and
    the performance coefficient is calculated based on the breakdown-related information stored in the storage section.

2. The insurance premium setting system according to claim 1, wherein
the breakdown-related information is working information of the working machine, and
the insurance premium setting section sets the insurance premium based on the working information.

3. The insurance premium setting system according to claim 2, wherein
the working information includes a working load of the working machine, and
the insurance premium setting section sets the insurance premium to a higher amount as the working load increases.

4. The insurance premium setting system according to claim 2, wherein
the working information includes a continuous working time of the working machine, and
the insurance premium setting section sets the insurance premium to a higher amount as the continuous working time increases.

5. The insurance premium setting system according to claim 2, wherein
the working information includes a cumulative working time of the working machine from an initial rental time of the user, and
the insurance premium setting section sets the insurance premium to a lower amount as the cumulative working time increases.

6. The insurance premium setting system according to claim 3, wherein
the working load is specified based on a temperature of a motor driver controlling a motor of the working machine, a voltage of the motor driver, a number of occurrences of motor lock that stops rotation of the motor, a temperature of an engine of the working machine, a voltage of a battery of the working machine, or a number of occurrences of operation interlock that stops drive of the engine.

7. The insurance premium setting system according to claim 1, wherein
the initial insurance premium setting section is configured to set the initial insurance premium based on a number of years of experience of the user using the working machine, and
the insurance premium setting section employs, as the reference insurance premium, the initial insurance premium set by the initial insurance premium setting section.

8. The insurance premium setting system according to claim 1, wherein
the working machine comprises an authentication section configured to identify the user operating the working machine, and
the storage section stores information of the user identified by the authentication section, and the breakdown-related information, in association with each other.

\* \* \* \* \*

UNITED STATES PATENT AND TRADEMARK OFFICE
CERTIFICATE OF CORRECTION

PATENT NO. : 11,386,500 B2
APPLICATION NO. : 16/770967
DATED : July 12, 2022
INVENTOR(S) : Dobashi It is certified that error appears in the above-identified patent and that said Letters Patent is hereby corrected as shown below:

In the Specification

At Line 35, in Column 10:
Insert "spirit of the present invention."

In the Claims

At Line 58, in Column 10, in Claim 1:
"and a is" should read "and α is"

Signed and Sealed this
Sixth Day of September, 2022

Katherine Kelly Vidal
*Director of the United States Patent and Trademark Office*